United States Patent
Jun (12)

(10) Patent No.: US 6,268,844 B1
(45) Date of Patent: Jul. 31, 2001

(54) APPARATUS AND METHOD OF DISPLAYING BACKLIGHT CONSUMPTION TIME FOR LCD MONITOR

(75) Inventor: Il-Jin Jun, Kumi (KR)

(73) Assignee: LG Electronics, Inc. (KR)

( * ) Notice: Subject to any disclaimer, the term of this patent is extended or adjusted under 35 U.S.C. 154(b) by 0 days.

(21) Appl. No.: 09/245,800

(22) Filed: Feb. 5, 1999

(30) Foreign Application Priority Data

Feb. 17, 1998 (KR) .................................................. 98/4715

(51) Int. Cl.[7] .................................................. G09G 3/36
(52) U.S. Cl. .................................................. 345/102; 345/87
(58) Field of Search .................. 345/87, 102, 36–38, 345/117

(56) References Cited

U.S. PATENT DOCUMENTS 5,345,392 * 9/1994 Mito et al. ............................ 364/482
5,786,801 * 7/1998 Ichise .................................. 345/102
6,078,302 * 6/2000 Suzuki ................................ 345/102

* cited by examiner

Primary Examiner—Richard Hjerpe
Assistant Examiner—Duc Dinh
(74) Attorney, Agent, or Firm—Ostrolenk, Faber, Gerb & Soffen, LLP

(57) ABSTRACT

A backlight consumption time display method and apparatus for an LCD monitor is disclosed. A the backlight consumption time stored in a memory storage unit with a preset backlight maximum consumption time is periodically compared. A backlight replacement instruction message is displayed on the screen when a hitherto backlight consumption time exceeds the maximum consumption time and, after the backlight replacement, the backlight consumption time stored in the memory storage unit is reset using a reset key in the key input unit. A timer is operated when a backlight driving control signal is turned on, a backlight consumption time preset in a memory storage unit is counted and the counted value is stored in a memory storage unit.

6 Claims, 2 Drawing Sheets

APPARATUS AND METHOD OF DISPLAYING BACKLIGHT CONSUMPTION TIME FOR LCD MONITOR

BACKGROUND OF THE INVENTION

1. Field of the Invention

The present invention relates to a backlight for an LCD (liquid crystal display) monitor, and more particularly, to an improved apparatus and method of displaying a backlight consumption time for an LCD monitor wherein the backlight consumption time is displayed on screen.

2. Description of the Background Art

A conventional LCD monitor has so far provided no particular composition and method for visually displaying its backlight consumption time. Assuming that an average longevity of LCD monitor backlight is around 50,000 hours, an average longevity of the backlight is understood to range from 10,000~25,000.

Theoretically, two to five times should a user replace the backlight in use for an LCD monitor.

Since the conventional LCD monitor is not provided with a device which informs a user of the backlight longevity of an LCD monitor, especially when the backlight is almost used up, there is strongly required such a device for a prior recognition of the backlight longevity.

SUMMARY OF THE INVENTION

The present invention is directed to overcoming the conventional disadvantages.

Therefore, it is an object of the present invention to provide an on-screen display apparatus which informs a user of a backlight replacement time, if the backlight is almost used up, by periodically storing its consumption time in a memory.

To achieve the above-described object, there is provided an on-screen display apparatus of backlight consumption time for an LCD monitor according to the present invention which includes a key input unit, a backlight data processing unit, a power control unit for outputting a driving voltage in response to an output signal of the backlight data processing unit, and a backlight driving unit for receiving a driving voltage from the power control unit and turning on the backlight.

Further, to achieve the above-described object, there is provided an onscreen display method of backlight consumption time according to the present invention which includes a first step for operating a timer when a backlight driving control signal is turned on, counting a backlight consumption time preset in a memory storage unit and storing the counted value in a memory storage unit, a second step for periodically comparing the backlight consumption time stored in the memory storage unit with a preset backlight maximum consumption time, a third step for displaying a backlight replacement instruction message on the screen when the hitherto backlight consumption time exceeds the maximum consumption time according to the determined result in the second step and resetting, after the backlight replacement, the backlight consumption time stored in the memory storage unit using a reset key in the key input unit, and a fourth step for continuously counting the consumption time when the hitherto backlight consumption time does not exceed the maximum consumption time according to the determined result in the second step and storing the counted value in the memory storage unit, and displaying on the screen the hitherto backlight consumption time stored in the memory storage unit when a key signal for displaying is applied to the key input unit.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
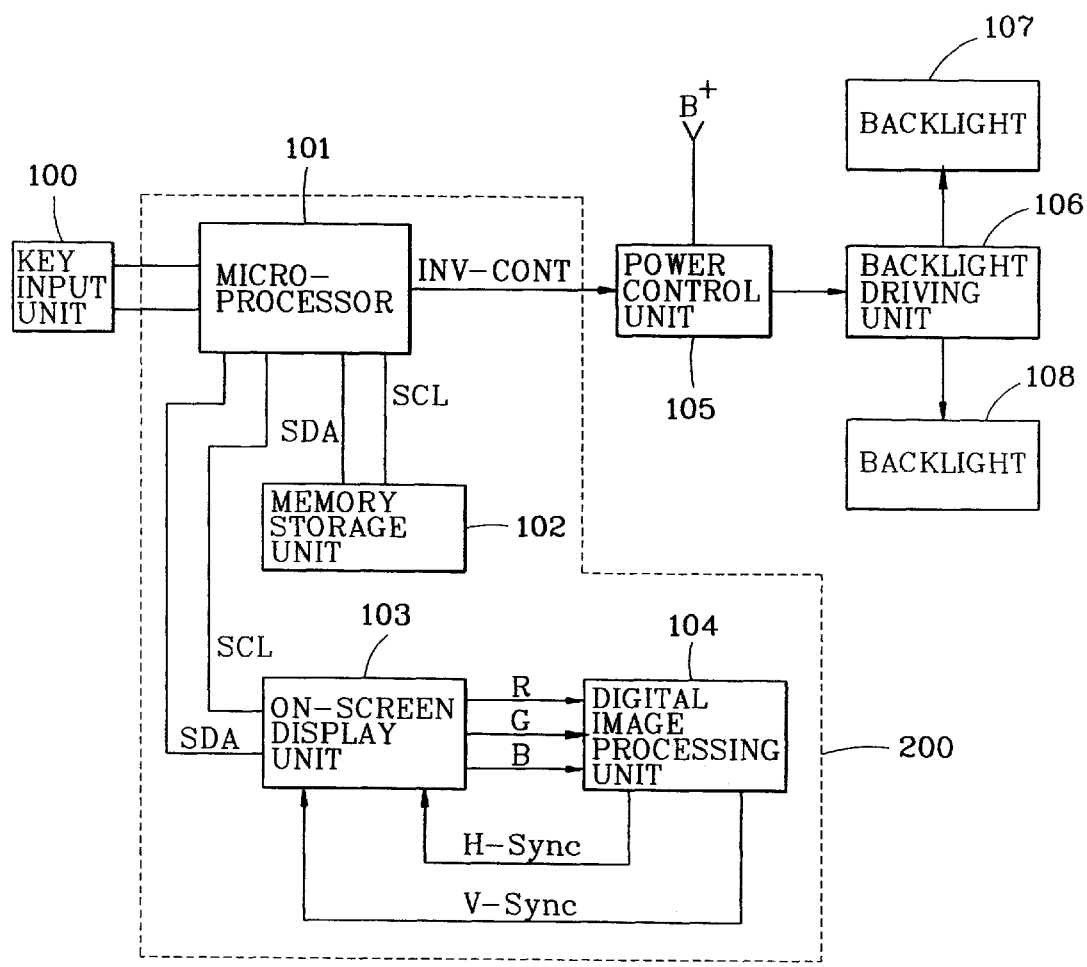
FIG. 1 is a block diagram illustrating a backlight longevity display apparatus for an LCD monitor.

As shown in FIG. 1, the backlight longevity time display apparatus for an LCD monitor includes a key input unit 100 having a key for displaying a hitherto backlight consumption time and a reset key for resetting a pre-stored backlight consumption time when replacing the backlight, a memory storage unit 102 in a backlight data processing unit 200 for storing therein the hitherto backlight consumption time, a microprocessor 101 in the backlight data processing unit 200 for displaying the hitherto backlight consumption time Ts stored in the memory storage unit 102, comparing the hitherto backlight consumption time Ts with a preset maximum consumption time Tm, determining the backlight longevity and controlling a series of steps so as to display the determined result, an on-screen display unit 103 connected to the microprocessor 101 and for outputting the hitherto backlight consumption time to an OSD screen, a digital image processing unit 104 for image-processing color signals R, G, B from the on-screen display unit 103 and displaying the processed result on an LCD monitor screen as an on-screen menu, a backlight driving unit 106 for driving the backlight in accordance with the control of the microprocessor 101, backlights 107, 108 for illuminating the LCD monitor under the control of the backlight driving unit 106, and a power control unit 105 for controlling power supply to the microprocessor 101 and the backlight driving unit 106.

Figure 2:
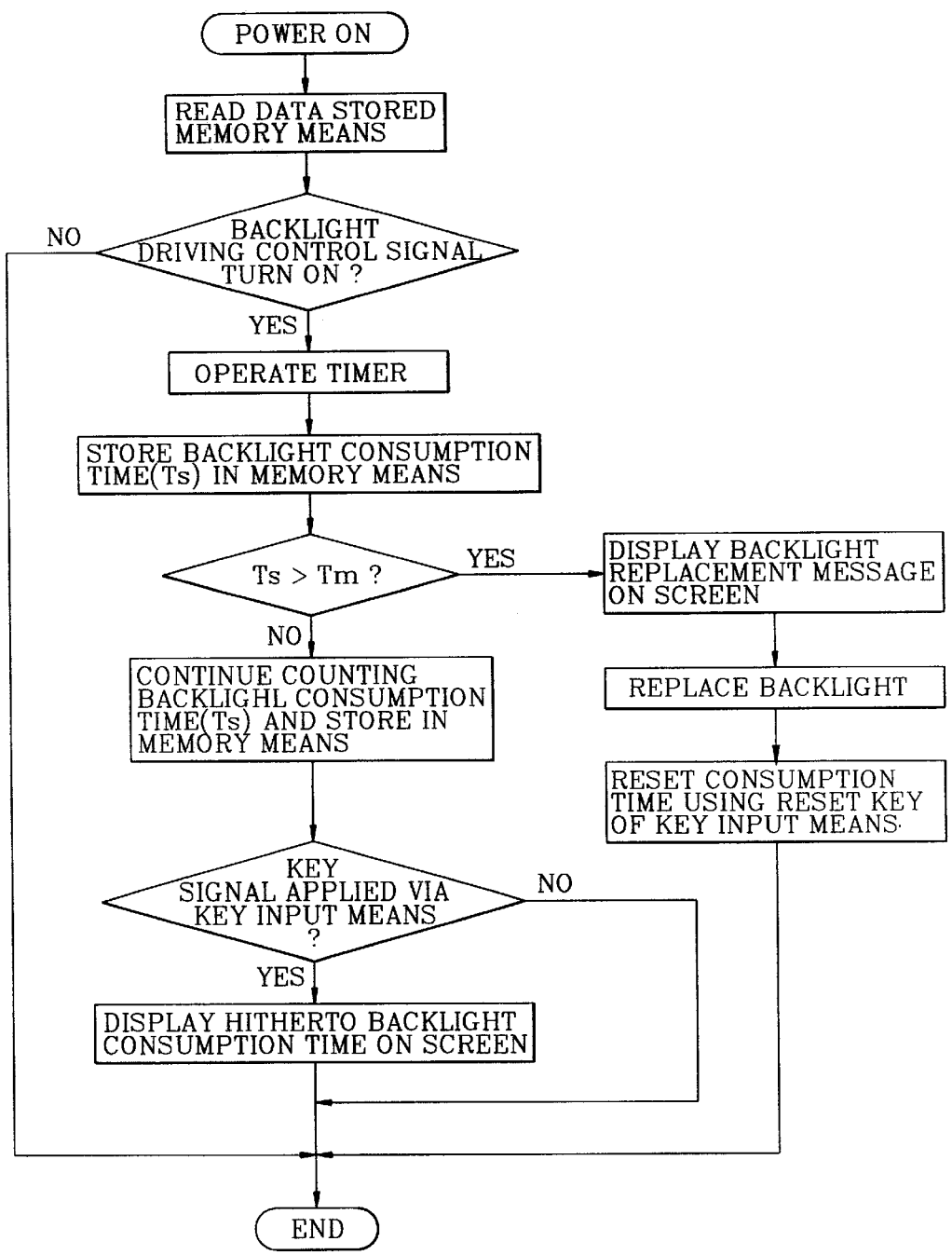
FIG. 2 is a flow chart illustrating a backlight longevity display apparatus for an LCD monitor.

FIG. 2 is a flow chart illustrating a backlight consumption time display method for an LCD monitor according to the present invention. As shown therein, the method includes a first step for operating a timer when a backlight driving control signal is turned on, counting a backlight consumption time Ts preset in the memory storage unit 102 and storing the counted value in the memory storage unit 102, a second step for periodically comparing the backlight consumption time Ts stored in the memory storage unit 102 with a preset backlight maximum consumption time Tm, a third step for displaying a backlight replacement instruction message on the screen if the hitherto backlight consumption time Ts exceeds the maximum consumption time Tm according to the determined result in the second step, and resetting, after the backlight replacement, the backlight consumption time stored in the memory storage unit 102 using the reset key in the key input unit 100, a fourth step for continuously counting the consumption time if the hitherto backlight consumption time Ts does not exceed the maximum consumption time Tm according to the determined result in the second step and storing the counted value in the memory storage unit 102, and displaying on the screen the hitherto backlight consumption time stored in the memory storage unit 102 if a key signal for displaying is applied to the key input unit 100.

The operation of the thusly constituted on-screen display apparatus of a backlight consumption time for an LCD monitor will now be explained in further detail with reference to FIGS. 1 and 2.

First, when a power is applied to an LCD monitor, the microprocessor 101 reads the backlight consumption time Ts stored in the memory storage unit 102 through a serial clock SCL terminal and a serial data SDA terminal and writes the read value in a RAM in the microprocessor 101.

At the same time, when a high level signal is outputted through a driving control terminal INV-CONT of the microprocessor 101 and the power control unit 105 is driven, a driving voltage B+ is outputted to the backlight driving unit 106.

The backlight driving unit 106 serves to turn on the backlights 107, 108 respectively attached to upper and lower portion of the LCD monitor in accordance with the driving voltage B+applied from the power control unit 105, thereby controlling brightness of the screen.

The microprocessor 101 starts counting the backlight consumption time written in the RAM from the moment at which the backlight driving control signal INV-CONT by an internally provided count, and the consumption time of each of the counted backlights 107, 108 is stored in the memory storage unit 102 having an EEPROM as a non-volatile memory device through the serial clock SCL and the serial data SDA terminals.

Then, the microprocessor 101 periodically compares the consumption time Ts of each of the backlights 107, 108 stored in the memory storage unit 102 with the preset maximum consumption time Tm. So, if the backlight consumption time Ts exceeds the maximum consumption time Tm it is determined the backlight is almost used up. Accordingly, a backlight replacement instruction is outputted to the on-screen display unit 103 through the serial clock SCL terminal and the serial data SDA terminal.

The on-screen display unit 103 processes, using color signals R, G, B, a backlight displacement outputted from the microprocessor 101 within horizontal and vertical synchronous signals H-sync, V-sync cycles applied from the digital image processing unit 104 and outputs the result to the digital image processing unit 104. The digital image processing unit 104 image-processes the color signals R, G, B outputted from the on-screen display unit 103 and displays the on-screen menu 1 (backlight replacement and service instructing menu) on the LCD monitor screen.

That is, when the backlight consumption time Ts has reached a maximum consumption time Tm, the replacement message is automatically displayed on the LCD monitor screen.

When the backlights 107, 108 are replaced, the backlight consumption time Ts stored in the memory storage unit 102 is reset by use of the key input unit 100, whereby the backlight consumption time is reset so as to be counted.

Also, when the consumption time Ts of the backlights 107, 108 does not exceed the maximum consumption time Tm, the microprocessor 101 continues counting the backlight consumption time, thereby updating the memory storage unit 102.

If a user wants to check up the hitherto consumption time of each of the backlights 107, 108, the key input unit 100 is pressed twice. Then, the microprocessor 101 outputs the hitherto backlight consumption time stored in the memory storage unit 102 to the on-screen display unit 103 through the serial clock SCL terminal and the serial data SDA terminal.

The on-screen display unit 103 processes the data representing the hitherto backlight consumption time applied from the microprocessor 101 within the horizontal and vertical synchronous signals H-sync, V-sync cycles by use of the color signals R, G, B. The digital image processing unit 104 image-processes the color signals R, G, B outputted from the on-screen display unit 103 and displays an on-screen menu 2 (hitherto backlight consumption time) on the LCD monitor screen.

In a power saving mode, a low level signal is outputted from the driving control terminal INV-CONT of the microprocessor 101 so as to turn off the backlights 107, 108, whereby the backlight consumption time stored in the memory storage unit 102 is not increased.

As described above, the backlight consumption time display apparatus according to the present invention allows the hitherto backlight consumption time to be displayed on the LCD monitor screen with the selection of the key input unit and when the maximum consumption time of the backlight has been reached, a backlight replacement instruction message is automatically presented to the user who then can determine when to replace the backlight, thereby realizing a further convenience of the user.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. An apparatus of displaying a backlight consumption state in an LCD (liquid crystal display) monitor which displays an image on the monitor screen, comprising:

a key input unit;

a backlight data processing unit;

a power control unit for outputting a driving voltage in response to an output signal of the backlight data processing unit; and a backlight driving unit for receiving a driving voltage from the power control unit and turning on the backlight;

wherein the backlight data processing unit comprises:
a memory storage unit for storing therein a hitherto backlight consumption time;
a microprocessor for periodically comparing the hitherto backlight consumption time with a preset maximum consumption time in accordance with the data stored in the memory storage unit so as to determine the backlight longevity and outputting a backlight replacement instruction message when the hitherto backlight consumption time exceeds the preset maximum consumption;

an on-screen display unit for processing the backlight replacement instruction message received from the microprocessor using color signals within an on-screen horizontal and vertical synchronous signal cycles; and a digital image processing unit for image-processing the color signals outputted from the on-screen display unit.

2. The apparatus of claim 1, wherein the key input unit comprises: a key for displaying the hitherto backlight consumption time; and a reset key for resetting the preset backlight consumption time when the backlight is replaced.

3. The apparatus of claim 1, wherein the memory storage means is an EEPROM.

4. The apparatus of claim 1, wherein the microprocessor includes a memory and a counter therein and wherein the counter is driven from the moment when a backlight driving control signal is turned on and counts the backlight consumption time written on the memory.

5. The apparatus of claim 4, wherein the memory is a RAM.

6. A backlight consumption time display method for an LCD monitor, comprising:

a first step for operating a timer when a backlight driving control signal is turned on, counting a backlight consumption time preset in a memory storage unit and storing the counted value in a memory storage unit;

a second step for periodically comparing the backlight consumption time stored in the memory storage unit with a preset backlight maximum consumption time;

a third step for displaying a backlight replacement instruction message on the screen when the hitherto backlight consumption time exceeds the maximum consumption time according to the determined result in the second step and resetting, after the backlight replacement, the backlight consumption time stored in the memory storage unit using a reset key in the key input unit; and a fourth step for continuously counting the consumption time when the hitherto backlight consumption time does not exceed the maximum consumption time according to the determined result in the second step and storing the counted value in the memory storage unit, and displaying on the screen the hitherto backlight consumption time stored in the memory storage unit when a key signal for displaying is applied to the key input unit.

* * * * *